United States Patent
Crain et al.

(10) Patent No.: US 7,630,184 B2
(45) Date of Patent: Dec. 8, 2009

(54) METHOD AND APPARATUS FOR AN OVER-VOLTAGE DETECTION CIRCUIT

(75) Inventors: Gary Carlos Crain, Orefield, PA (US); Douglas D. Lopata, Boyertown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/526,522

(22) Filed: Sep. 25, 2006

(65) Prior Publication Data

US 2008/0074817 A1   Mar. 27, 2008

(51) Int. Cl.
*H02H 7/00* (2006.01)
(52) U.S. Cl. ......................... 361/91.1; 361/18
(58) Field of Classification Search ............. 361/18, 361/56–58, 91.1, 111
See application file for complete search history.

(56) References Cited

U.S. PATENT DOCUMENTS

| | | | |
|---|---|---|---|
| 4,962,485 A * | 10/1990 | Kato et al. | 365/229 |
| 5,254,953 A | 10/1993 | Crook et al. | |
| 5,463,252 A * | 10/1995 | Jones et al. | 257/723 |
| 5,490,117 A * | 2/1996 | Oda et al. | 365/226 |
| 5,557,209 A | 9/1996 | Crook et al. | |
| 5,589,719 A | 12/1996 | Fiset | |
| 5,948,085 A | 9/1999 | Blatter | |
| 6,035,357 A * | 3/2000 | Sakaki | 710/301 |
| 6,259,371 B1 * | 7/2001 | Chang | 340/659 |
| 6,411,544 B1 * | 6/2002 | Devin | 365/185.01 |
| 6,459,175 B1 | 10/2002 | Potega | |
| 6,819,539 B1 * | 11/2004 | Wright et al. | 361/90 |
| 6,836,814 B2 | 12/2004 | Takaoka et al. | |
| 7,002,265 B2 | 2/2006 | Potega | |
| 7,012,417 B2 | 3/2006 | McClure | |
| 7,020,357 B2 | 3/2006 | Hadba et al. | |
| 7,142,400 B1 * | 11/2006 | Williams et al. | 361/18 |
| 7,359,173 B2 * | 4/2008 | Biagi et al. | 361/104 |
| 2006/0222059 A1 * | 10/2006 | Ruff et al. | 375/219 |
| 2007/0152732 A1 * | 7/2007 | Solano | 327/525 |

* cited by examiner

*Primary Examiner*—Danny Nguyen

(57) ABSTRACT

A method and apparatus for embedding over-limit voltage detector and recording mechanisms on the silica wafer of integrated circuits to detect, protect and record voltage overages of pre-set voltage limits is presented. A detector circuit and a recorder circuit are placed in series or in parallel on the electrical connections between the integrated circuit devices and the voltage pins connected to outside power sources. When a voltage source is connected and an over-voltage condition is detected, the detector circuit short-circuits the connection while the recorder circuit records the event for later investigation.

13 Claims, 3 Drawing Sheets

METHOD AND APPARATUS FOR AN OVER-VOLTAGE DETECTION CIRCUIT

FIELD OF THE INVENTION

The present invention is generally directed to a method and apparatus for an over-voltage detection circuit to identify integrated circuit abuse, and more particularly, to the integration of over-limit voltage event detecting and recording mechanisms onto integrated circuit boards to detect and record applied voltages beyond specified limits/ranges.

BACKGROUND OF THE INVENTION

Cell phones are designed to operate within certain voltage parameters. Exceeding the specified maximum positive or negative voltage will damage the internal circuitry of the phone. When voltages are applied to integrated circuits that are beyond the specified maximum, Electrical Over Stress (EOS) damage occurs. EOS damage causes the integrated circuit to fail and disables the phone.

The following three examples describe possible situations that could cause EOS damage. First, external batteries and chargers provide power for operation. If the external battery or charger is defective or designed improperly, it can supply voltages beyond the specified maximum voltage. Second, during phone production, external test jigs stimulate the phone with different voltages while checking operation. If the test jig is improperly designed, or out of specification, the specified maximum voltage can be exceeded. Third, end customers may accidentally apply voltages exceeding specifications by using unapproved third party accessories. Additional situations exist that can also cause detectable EOS damage.

Phones and devices exposed to the described EOS inducing situations can fail. Phone manufacturers currently return failed phones and devices to the device manufacturer. Failure Mode Analysis (FMA) is performed on the devices to determine the defect. One type of failure mode is EOS, as mentioned above, and is determined by the failure signature observed on the integrated circuit. Several situations could Cause EOS damage. Manufacturers try to identify the probable cause of the EOS damage by applying different over voltage conditions to several devices and performing FMA analysis on each one. Once an experimental device shows similar characteristics to the customer-failed device, the manufacturer can theorize the cause.

However, considerable FMA work is required to detect EOS damage induced in the described manners. Non-working phones and devices are often returned with no explanation of how the failure occurred. Final end customers either do not know or are unwilling to disclose how the EOS damage is induced. The OEM intermediate customer assumes that the phone was never used out of compliance and requires the manufacturer to explain how their devices could not withstand "normal" operating environments. Only circumstantial evidence of the EOS failure indicates that voltages exceeding the maximum positive or negative specified voltage have been applied to the devices. There is never any hard proof to indicate such an event, and therefore, the customer is never completely satisfied with the manufacturer's response to the submitted failure.

In addition, it is very time consuming to perform the experiment of damaging a device in a predicted manner and then performing FMA analysis to determine if it matches the original customer-failed device. Each experiment cycle can add 7 business days. It is not uncommon to have several experimental cycles, so 14-20 days can easily be added to the evaluation interval. EOS damage is usually considered critical and could shut down a factory assembly line resulting in lost revenue for both companies. Solving the problem as quickly as possible saves both the manufacturer and the retailer money.

Lastly, performing FMA is expensive. Considerable cost can be saved if only one FMA cycle is needed to determine the root cause of the EOS failure. If multiple FMA cycles are needed on new customer-failed devices and experimental devices, the cost can be significant. Solving the EOS failure in one FMA cycle provides considerable cost savings.

The current methods do not identify the exact cause of the failure. Instead, they provide circumstantial evidence that matches the type of damage seen on the customer-failed device. The evidence is not conclusive and does not decisively identify the root cause of the failure. If a customer has a clearly identified root cause, they can search their process or use-cases to determine how the condition causing the failure occurred.

SUMMARY OF THE INVENTION

Accordingly, the present invention addresses these problems by placing indicators on the integrated circuit to detect when input voltages applied to devices exceed the specified maximum.

Circuitry is placed on an integrated circuit, detecting when input voltages are applied that exceed the maximum positive or negative specified value. Such circuitry can utilize software programs and readable registers to assist in determining and recording such voltage overages. The detector and recorder circuit permanently records that event for future investigations.

The present invention, including its features and advantages, will become more apparent from the following detailed description with reference to the accompanying drawings.

DETAILED DESCRIPTION

FIGS. 1 through 6a/b illustrate the apparatus and method of over-voltage detection and recording circuits to identify integrated circuit abuse, and examples thereof. Detector circuits and recording circuits (collectively referred to hereinafter as the "event-recording mechanisms") are placed on integrated circuits to monitor for over-limit voltage events on suspect voltage supplies. "Over-limit voltage events" are defined as any time a voltage level is presented to an integrated circuit pin that exceeds the maximum positive or negative specified parameters for that circuit. As mentioned above, over-limit voltage events can induce EOS damage, crippling the integrated circuit.

Figure 1:
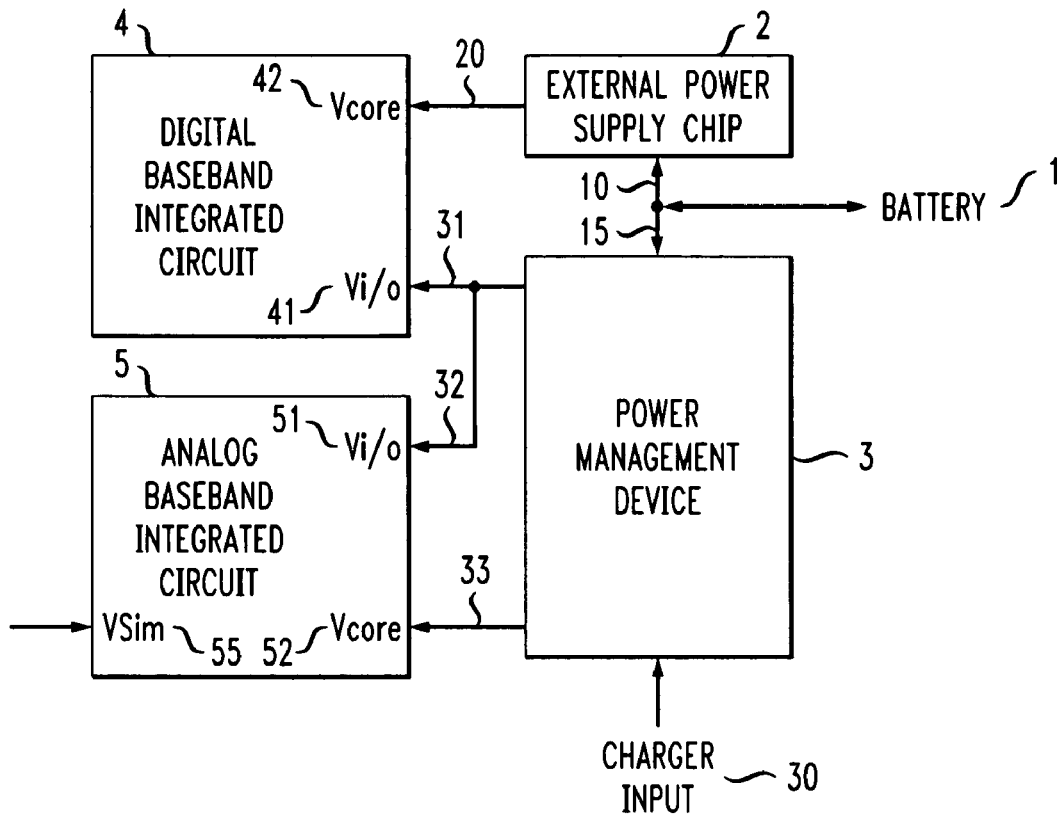
FIG. 1 is an illustration of voltage interfaces requiring Electrical Over Stress (EOS) damage detection, according to an embodiment of the present invention.

Referring now to FIG. 1, the figure shows that power for the integrated circuit may be supplied from either internal or external sources. An input battery 1 can be connected via electrical connections 10 and 15 to an external power supply chip 2 or a power management device 3, respectively. The input battery 1 is understood to preferably be any device in which chemical energy is stored and directly converted to electrical energy and from which a voltage is derived, rather than electrical energy derived from a direct power supply, although such power source is to be understood to be within the scope of the present invention. Alternatively, it is to be understood that the external power supply chip 2 can be used to power the integrated circuits directly via connection 20.

The power management device 3, supplied power from the input battery 1 or the external power supply chip 2, can also be connected to an external charger adapter (not shown) via charge input 30. One purpose of the power management device 3 is to attempt to protect the telephony integrated circuit components from power surges and voltage spikes by smoothing out or regulating the peaks and dips associated with power sources.

As shown in FIG. 1, the telephony components requiring placement of the detector circuit and recording circuit are the integrated circuits on the circuit boards (i.e., those containing the miniaturized electronic circuit devices consisting mainly of semiconductor devices and passive components). Accordingly, a digital baseband integrated circuit 4 and an analog baseband integrated circuit 5 are shown. By way of explanation, the digital integrated circuit can contain logic gates, flip-flops, multiplexers and other circuits, while the analog integrated circuit can contain amplifiers, filters, modulators, and mixers, among other things. Nonetheless, it is to be understood that a mixed signal integrated circuit (i.e., both analog and digital on the same chip) and a memory device integrated circuit may be included within the scope of the present invention. In addition then, it is to be understood that event recording mechanisms may be placed throughout the integrated circuit at various points to record not only over-limit voltage events from power sources, but also the effect that such has on the various sub-components within the chip.

As the input battery 1 and external power supply chip 2 may be electrically connected directly to the circuitry of the integrated circuits, the detector and recording circuitry of the present invention should be placed on any input pin that has a high probability of being driven beyond its maximum specified operating voltage. For instance, these pins might include the Vi/o pins 41 and 51, the Vcore pins 42 and 52, and the VSim pin 55. The Vi/o pins are understood to be the input/output connections for where power is supplied to the circuitry of the integrated circuit. The Vcore pins are understood to be the connections where power is supplied to the core circuitry of the integrated circuit. The VSim pin is understood to be the connection where power is supplied to the SIM Card (not shown). Such power is usually supplied by the phone itself, but in some cases testing may induces a voltage across such a connection. It is to be understood, of course, that since the customer application is not known in advance, pins that are normally powered by a source within the chipset, but could be powered by an external device, should be protected. Furthermore, it is to be understood, of course, that the connections need not be limited to pins, but rather may be any means by which an electrical current may be conducted.

Figure 2:
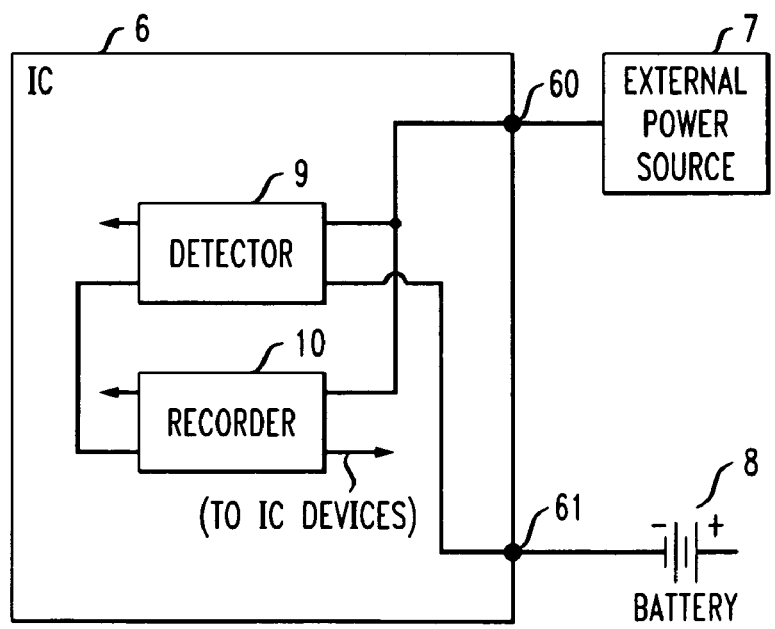
FIG. 2 is an illustration of the placement of detector and recording circuits within telephony components, according to an embodiment of the present invention.

Referring now to FIG. 2, it is shown by way of example that inexpensive "maximum voltage detector" circuits and recording circuits are placed on each voltage source input that is vulnerable to voltage conditions exceeding maximum specifications. Here integrated circuit 6 has a voltage pin 60 connected to an external power source 7, and a voltage pin 61 connected to an external battery power source 8. It is to be understood, of course, that integrated circuit 6 may be a digital, analog or mixed signal integrated circuit, that voltage pins 60 and 61 may be Vi/o, V core or VSim pins, and that the external power sources 7 and 8 may be any acceptable power supply.

Placed within the integrated circuit 6 are a detector circuit 9 and a recording circuit 10. As shown, it is to be understood that the event-recording mechanisms may be placed in parallel, as shown by the electrical connections leading from voltage pin 60, or in series, as shown by the electrical connections leading from voltage pin 61. Accordingly, when placed in parallel each of the event-recording mechanisms will be subject to the same voltage, while when placed in series each of the event-recording mechanisms will be subject to the same current. Dependant upon what information is sought regarding the EOS damage, the event-recording circuits can be structured accordingly. It is to be understood, of course, that more than one detector circuit 9 and recording circuit 10 may be utilized with each voltage pin 60/61 as needed. Thus the event-recording mechanism may be utilized such that both in-parallel and in-series placement is covered. Lastly, it is to be understood that while the event-recording mechanisms have been shown to be separate circuits, it is possible that each function be accomplished by a single circuit.

In a preferred embodiment, the detector circuit 9 and the recording circuit 10 are embedded in the silicon of the integrated circuit. Thus, the well-known techniques of semiconductor device fabrication (i.e., imaging, deposition, etching) may be utilized to form the event-recording mechanisms on the silica wafer. During such production, it is important that the detector circuit be designed to operate on voltages slightly more than the maximum specified operating voltage for the remainder of the integrated circuit. Preferably, the threshold for indicating when an input voltage exceeds the maximum specified operating voltage can be determined by the "maximum operating voltage" (both positive and negative) stated in the data sheet for the remaining integrated circuit components. In this manner it will be ensured that the event-recording circuit operates properly when it detects an over-limit voltage event.

Figure 3:
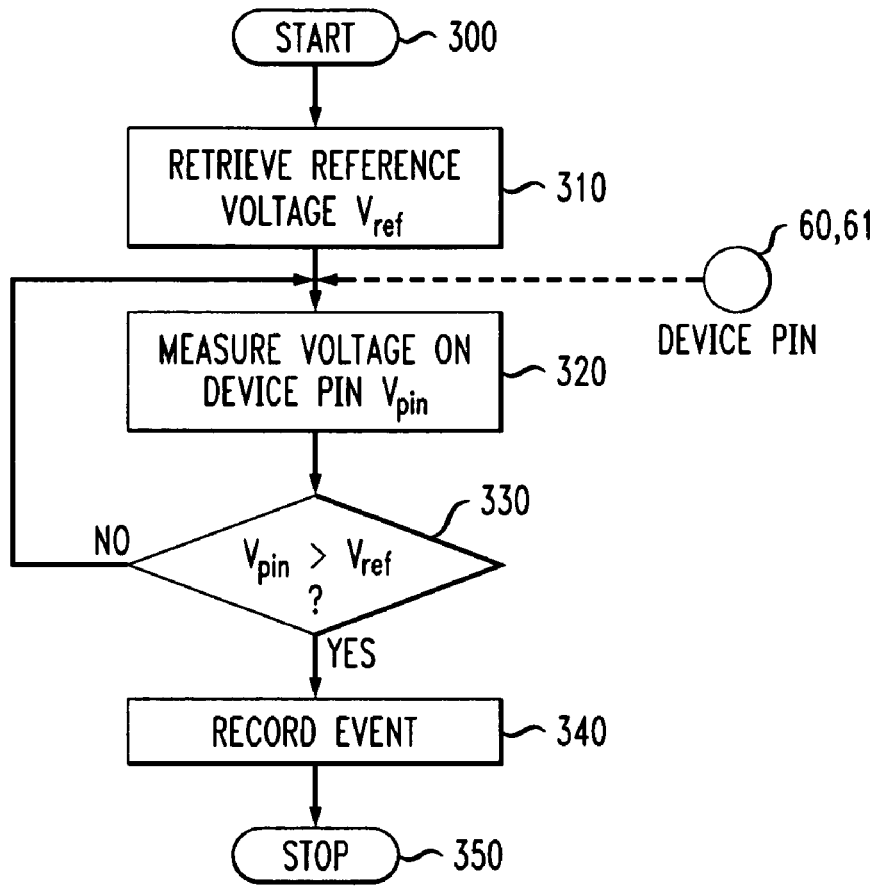
FIG. 3 is an illustration of the steps of a method of detecting and recording EOS, according to an embodiment of the present invention.

Referring now to FIG. 3, a method of detecting and recording EOS damage begins in step 300 upon power-up of the integrated circuit chip 6. In step 310 then, the reference voltage $V_{ref}$ is retrieved. Such reference voltage can be stored in a memory (not shown), or may be supplied by some other means, and, as previously stated, should be slightly greater than the maximum specified tolerated voltage of the component of the integrated circuit the event recording mechanisms are connected to. Upon voltage application across the device pins $V_{pin}$ 60 and/or 61, in step 320 such voltage through that device pin is measured. A comparison, in step 330, between the reference voltage $V_{ref}$ and the applied voltage across the device pin $V_{pin}$ occurs. If the measured voltage $V_{pin}$ is determined to be greater than the reference voltage $V_{ref}$ then in step 340 the over-limit voltage event is recorded. If the measured voltage $V_{pin}$ is determined not to be greater than the reference voltage $V_{ref}$ then measuring of the voltage passing across the device pin 60, 61 (i.e., step 320) continues. Such detection and recording continue until it is stopped in step 350.

Figure 4:
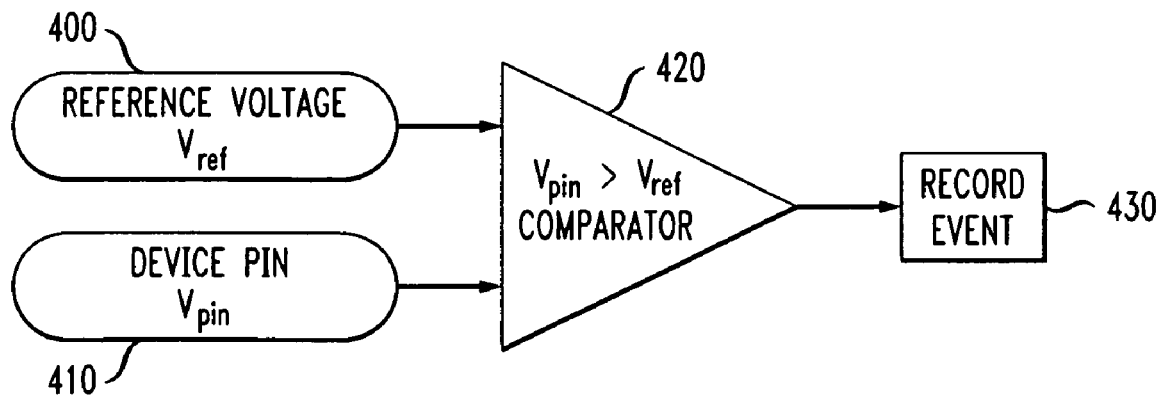
FIG. 4 is an illustration of functional aspects of the apparatus and method of the over-voltage detection and recording circuits, according to an embodiment of the present invention.

Accordingly, referring now to FIG. 4, the overall functional aspect of the method of detecting and recording EOS damage and operation of the event-recording mechanism is shown. Input information 400 and 410, consisting of the reference voltage $V_{ref}$ and the voltage across the device pin $V_{pin}$, respectively, is received by the comparator 420. Comparator 420 constantly monitors the device pin and the voltage there across. As mentioned above, this voltage is compared against the predetermined reference voltage, and whenever the voltage on the device pin $V_{pin}$ is greater than the reference voltage $V_{ref}$ the comparator 420 registers "true". Such "true" event is recorded 430.

In further explanation, operational examples of the over-limit voltage event occurring when a power supply is connected to either voltage pins 60 or 61 is no discussed. In the instance where an external power source 7 is connected to voltage pin 60 and a surge in an electrical potential occurs, commonly referred to as a spike or peak, such voltage is conducted along the connecting wires to the detector circuit 9 and the recording circuit 10. If the conducted voltage is higher than the maximum operating voltage of the devices (not shown) of the integrated circuit 6, then the detection circuit short circuits. In essence causing an open circuit no longer capable of conducting electricity. The same scenario holds true in the instance where the battery 8 is connected to voltage pin 61 to the detector circuit 9 and the recording circuit 10. For example, if the maximum operating voltage of the devices (not shown) of the integrated circuit 6 is set at 6 volts, then should a voltage of 6.1 or more volts be conducted across pin 61 from battery 8, the detector circuit 9 will cause a short circuit breaking electrical contact of the devices of integrated circuit 6 from the battery 8, while the recording circuit 10 will record the event in such a manner that information about the over-limit voltage event can later be retrieved. Preferably, the detector circuit 9 thus can be comprised of a circuit breaker, fuse (of a type either electrical or semiconductor), or alternative electrical circuit device, and the recording circuit 10 thus can be comprised of a memory cell (such as a flash drive memory). Additionally, the detector should be designed to ignore Electrostatic Discharge (ESD) events.

Usually an EOS event damages the integrated circuit in such a manner that it cannot operate. Therefore, the detector should record when an over-voltage event occurs in a manner that can be determined at a later time without operating the integrated circuit. One such method would be through the utilization of software. For instance, the comparator 420 output can be monitored by a software program that reads the value and stores it in a non-volatile memory. An example of such software algorithm might be:

```
=====
Read(value of device pin (V_pin))
If(V_pin > V_ref)
        Write(maximum voltage value exceeded on Pin_x)
=====
```

Figure 5:
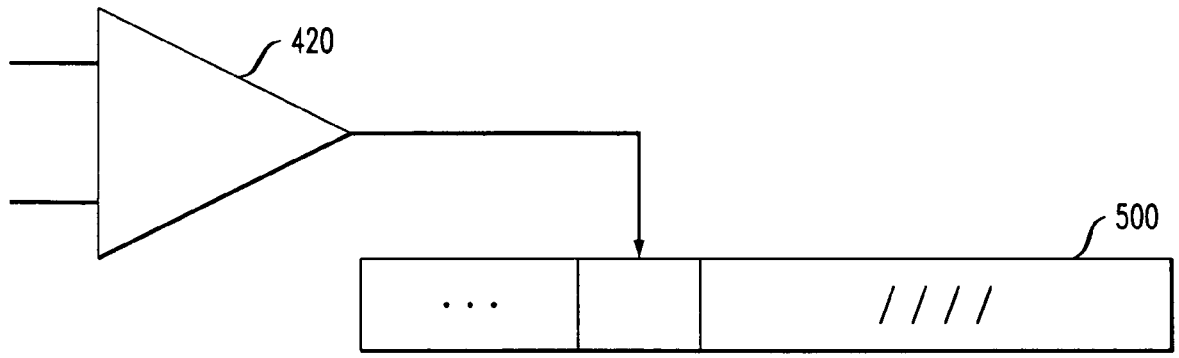
FIG. 5 is an illustration of an example of a method of recording EOS damage via an error register, according to an embodiment of the present invention.

Another such method allowing for such later determination of when the voltage exceeds the specified maximum value, as shown in FIG. 5, is to read the value of all detector-recording devices into readable registers 500. A particular bit 510, of the register 500, can be set when an over-voltage event occurs. Thereupon, if the chip still functions, it would be possible to read back the state of the recording device without destroying the integrated circuit. Unfortunately, EOS damage often disables the integrated circuit, so the registers may not be available to interrogate in this manner without some external means for read-out.

Figure 6A:
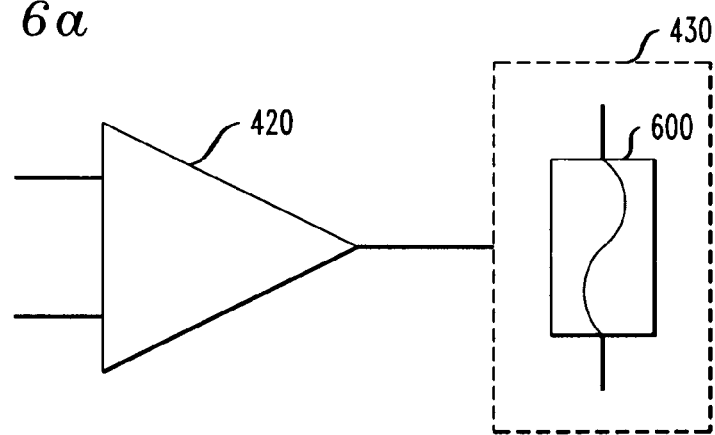
FIGS. 6a and 6b are illustrations of an example of a method of recording EOS damage via a visible link, according to an embodiment of the present invention.
Figure 6B:
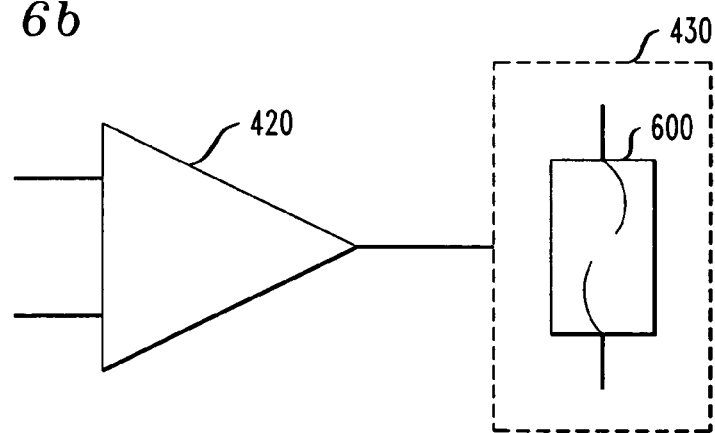

Another such method allowing for such later determination of when the voltage exceeds the specified maximum value is shown, before and after, in FIGS. 6a and 6b respectively. Therein the detector circuit 430 in such an embodiment would blow a fuse link 600 permanently indicating that event. As is well know, additionally the fuse can protect the circuit by melting when the current becomes excessive. Stripping back the package and physically observing the fuse link during the FMA process would detect its status. If the detector device is a fuse link, it is easy to determine the state of the detector by observing if the fuse is blown or not.

The detector and recording circuitry should be kept as small as possible for economic reasons. An extension to the present invention is to have two recording circuits per detector, one for positive voltages and a second for negative voltage. One of the uses of this mechanism is notifying the customer of exactly what kind of voltage condition caused the EOS damage. This allows the customer to narrow down the root cause search to either a positive or negative maximum voltage.

Thus, as can be seen from the above disclosure, the present invention identifies EOS failures caused when voltages are supplied to the device that are beyond the maximum specified, reduces the amount of time and expense to detect such over voltage failures, and conclusively indicates the root cause of the EOS damage so that manufacturers can actively pursue fixing a specific problem in their process.

In the foregoing description, the method and apparatus of the present invention have been described with reference to a specific example. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. An apparatus for protecting integrated circuitry from over-voltage events, the apparatus comprising:
    an integrated circuit chip, having a connector pin to which a power source may be connected;
    a power management device, which regulates the power source; and
    an over-voltage even recording mechanism, embedded on the integrated circuit chip, connected between the connector pin and at least one circuit device contained on the integrated circuit chip,
    a detector circuit, embedded on the integrated circuit chip, comprising at least one of a circuit breaker and a fuse, of a type of one of either electrical and semiconductor, wherein the detector circuit is adapted to cause a short circuit condition in an over-voltage condition;
    wherein the over-voltage event recording mechanism protects the at least one circuit device by causing a short circuit condition on the integrated circuit chip, said short circuit condition causing the at least one of a circuit breaker and a fuse to open, and wherein determination of the short circuit condition is possible through physical observation by viewing the state of at least one of the circuit breaker and the fuse, and
    wherein the over-voltage event recording mechanism comprises one or more detector circuits and at least one recording circuit connected in parallel.

2. The apparatus according to claim 1, wherein the over-voltage event recording mechanism further comprises at least one of:
   a recording circuit designed to record the over-voltage event in a medium that information relating to the event can be retrieved at a later time; and
   wherein the detector circuit is designed to operate on voltages slightly more than the maximum specified operating voltage of the at least one circuit device on the integrated circuit chip.

3. The apparatus according to claim 1, wherein the over-voltage event recording mechanism further comprises at least one of:
   a memory cell; and
   a readable register.

4. The apparatus according to claim 1, wherein the over-voltage event recording mechanism comprises one or more detector circuits and at least one recording circuit connected in series.

5. The apparatus according to claim 1, wherein the detector circuit is designed to ignore electrostatic discharge events.

6. The apparatus according to claim 1, wherein when an over-voltage event has occurred, a determination that such an event occurred can be determined by reading at least one value of a readable register.

7. An apparatus for detecting applied voltages to the connector pins of a telephony device, the apparatus comprising:
   at least one detector circuit, designed to allow for voltages across the connector pins from an external power source to an integrated circuit of the telephony device and comprising:
   a detector means, embedded on the integrated circuit, for causing a short circuit condition in an over-voltage condition, the detector means comprising at least one of a circuit breaker and a fuse, of a type of one of either electrical and semiconductor, wherein said short circuit condition causes the at least one of said circuit breaker and said fuse to open, wherein determination of the short circuit condition is possible through physical observation by viewing the state of at least one of the circuit breaker and the fuse, and
   a means for recording the over-voltage event,
   wherein the detector circuit is embedded on the silica wafer of the integrated circuit; and
   a power management device, which regulates the external power source, and
   wherein the over-voltage event recording means comprises one or more detector circuits and at least one recording circuit connected in parallel.

8. The apparatus according to claim 7, wherein the means for recording the over-voltage event comprises at least one of:
   a memory cell; and
   a readable register.

9. The apparatus according to claim 7, wherein the at least one detector circuit is designed to operate on voltages slightly more than the maximum specified operating voltage of at least one circuit device on the integrated circuit of the telephony device.

10. The apparatus according to claim 7, wherein the at least one detector circuit is designed to record the over-voltage event in a medium that information relating to the event can be retrieved at a later time.

11. The apparatus according to claim 7, wherein the at least one detector circuit is designed to ignore electrostatic discharge events.

12. The apparatus according to claim 7, wherein when an over-voltage even has occurred, a determination that such an event occurred can be determined by reading at least one value of a readable register.

13. The apparatus according to claim 7, wherein the integrated circuit of the telephony device is one of a digital integrated circuit, an analog digital circuit a mixed signal integrated circuit and a memory device integrated circuit.

* * * * *